United States Patent [19]
Flotow et al.

[11] Patent Number: 5,421,438
[45] Date of Patent: Jun. 6, 1995

[54] CLUTCH HAVING HYDRODYNAMIC COOLING OF PRESSURE PLATE

[75] Inventors: Richard A. Flotow, Butler; Andrew Szadkowski, Fort Wayne, both of Ind.

[73] Assignee: Dana Corporation, Toledo, Ohio

[21] Appl. No.: 166,762

[22] Filed: Dec. 14, 1993

[51] Int. Cl.6 .............................................. F16D 13/72
[52] U.S. Cl. ............... 192/70.12; 192/113.24; 192/113.25; 188/264 A
[58] Field of Search ........... 192/70.12, 113.23, 113.24, 192/113.25; 188/264 A

[56] References Cited

U.S. PATENT DOCUMENTS

| | | | |
|---|---|---|---|
| 1,983,885 | 12/1934 | Spase | 192/70.12 |
| 2,182,387 | 12/1939 | Probst . | |
| 2,205,629 | 6/1940 | Peterson . | |
| 2,646,151 | 7/1953 | Wellman et al. . | |
| 2,885,047 | 5/1959 | Kehrl . | |
| 2,976,975 | 3/1961 | Thostenson et al. . | |
| 3,184,023 | 5/1965 | Hovde . | |
| 3,213,986 | 10/1965 | Smirl | 192/70.12 |
| 3,707,211 | 12/1972 | Kuno | 192/113.24 |
| 4,413,716 | 11/1983 | Newsome et al. | 192/70.12 |
| 4,529,074 | 7/1985 | Alas . | |
| 4,560,048 | 12/1985 | Flotow . | |
| 4,629,047 | 12/1986 | Lu | 192/70.12 |
| 4,657,128 | 4/1987 | Fujito et al. . | |
| 4,667,794 | 5/1987 | Martinez-Corral et al. . | |
| 4,848,531 | 7/1989 | Gray et al. . | |
| 4,886,153 | 12/1989 | Takenaka et al. | 192/70.12 X |
| 4,923,043 | 5/1990 | Okuno | 192/70.12 |
| 4,947,973 | 8/1990 | Takeuchi | 192/70.12 |
| 5,072,816 | 12/1991 | Takeuchi et al. | 192/70.12 |
| 5,080,212 | 1/1992 | Flotow et al. . | |
| 5,099,973 | 3/1992 | Flotow et al. . | |

*Primary Examiner*—Andrea L. Pitts
*Attorney, Agent, or Firm*—Dykema Gossett

[57] ABSTRACT

An improved friction assembly includes a pressure plate having a plurality of axially extending vanes which extend substantially from an inner diameter to an outer diameter of the pressure plate. The pressure plate rotates about an output drive shaft. The pressure plate is enclosed in a housing and a cover, wherein the cover is contoured to partially enclose the pressure plate and to allow air to flow from outside the cover to an inner diameter of the pressure plate. A retainer assembly is positioned circumferentially about the output drive shaft. A plurality of coil springs extend radially between the retainer assembly and the cover, at least some of the coil springs being angled to urge the retainer assembly towards the pressure plate. A plurality of levers cooperate with the retainer assembly providing axial movement of the pressure plate, the pressure plate engaging and disengaging the driven disc. Rotation of the pressure plate causes air to be moved from outside the clutch cover to an inner diameter of the pressure plate, across the pressure plate, and outside the clutch.

14 Claims, 2 Drawing Sheets

CLUTCH HAVING HYDRODYNAMIC COOLING OF PRESSURE PLATE

FIELD OF THE INVENTION

This invention generally relates to a friction clutch or brake assembly and, more particularly, to improved hydrodynamic cooling of a pressure plate within the friction assembly.

BACKGROUND OF THE INVENTION

A pressure plate of a friction clutch or brake assembly is subject to extreme heat due to frictional engagement between a pressure plate and a driven disc. The heat is frictionally generated by slippage of the pressure plate and driven disc during coupling of the two members.

In a light duty clutch, frictionally generated heating of the pressure plate is less problematic than in a heavy duty clutch in part because the light duty clutch operates under less load. Further, a light duty clutch typically does not include enclosure of the pressure plate, inhibiting the air flow to the pressure plate. In contrast, the pressure plate of a heavy duty clutch is typically enclosed in a housing having a cover attached to the housing. The enclosure of the pressure plate inhibits, or even prevents, flow of cooler outside air across the pressure plate.

It is known in the art to use axially extending vanes on the pressure plate of a light duty clutch. As the pressure plate rotates, the vanes move air across the pressure plate from the inner diameter of the pressure plate to the outer diameter of the pressure plate. The use of vanes in the heavy duty clutch without ventilation is ineffective because the warmer air within the housing and cover is merely recirculated.

In the conventional heavy duty clutch, the air flow to the pressure plate is further inhibited by a disc-shaped diaphragm spring which applies a force to engage the pressure plate and driven disc. With such a clutch, the flow of outside air to the pressure plate is inhibited not only by the housing and cover, but also by the diaphragm spring. Therefore, the use of vanes on the pressure plate is particularly ineffective.

It is, therefore, a goal of the present invention to provide a friction assembly for a heavy duty clutch having a housing and a cover, wherein air is moved from outside the cover to the inner diameter of the pressure plate and across the pressure plate to facilitate cooling.

SUMMARY OF THE INVENTION

In accordance with the present invention, a friction assembly having improved hydrodynamic cooling is provided. The friction assembly includes a pressure plate having a plurality of axially extending vanes which extend substantially from an inner diameter to an outer diameter of the pressure plate. Rotation of the pressure plate moves cooler air from outside a housing and a cover. The cover is contoured to partially enclose the pressure plate, but also to allow air flow from outside the cover to the pressure plate. A plurality of levers cooperates with a retainer assembly providing axial movement of the pressure plate, the pressure plate engaging and disengaging from the driven disc. Each of the levers includes an aperture for improved air flow. Ventilation of air through the friction assembly is further facilitated by replacing a diaphragm spring with a plurality of coil springs, which are angled to provide a force on a retainer assembly to urge engagement between the pressure plate and a driven disc. The cooler outside air is then moved across the pressure plate and outside the friction assembly through circumferential slits defined by the pressure plate and cover.

These and other features of the present invention can be best understood from the following specification and drawings, of which the following is a brief description.

DETAILED DESCRIPTION OF THE PREFERRED EMBODIMENT

Figure 1:
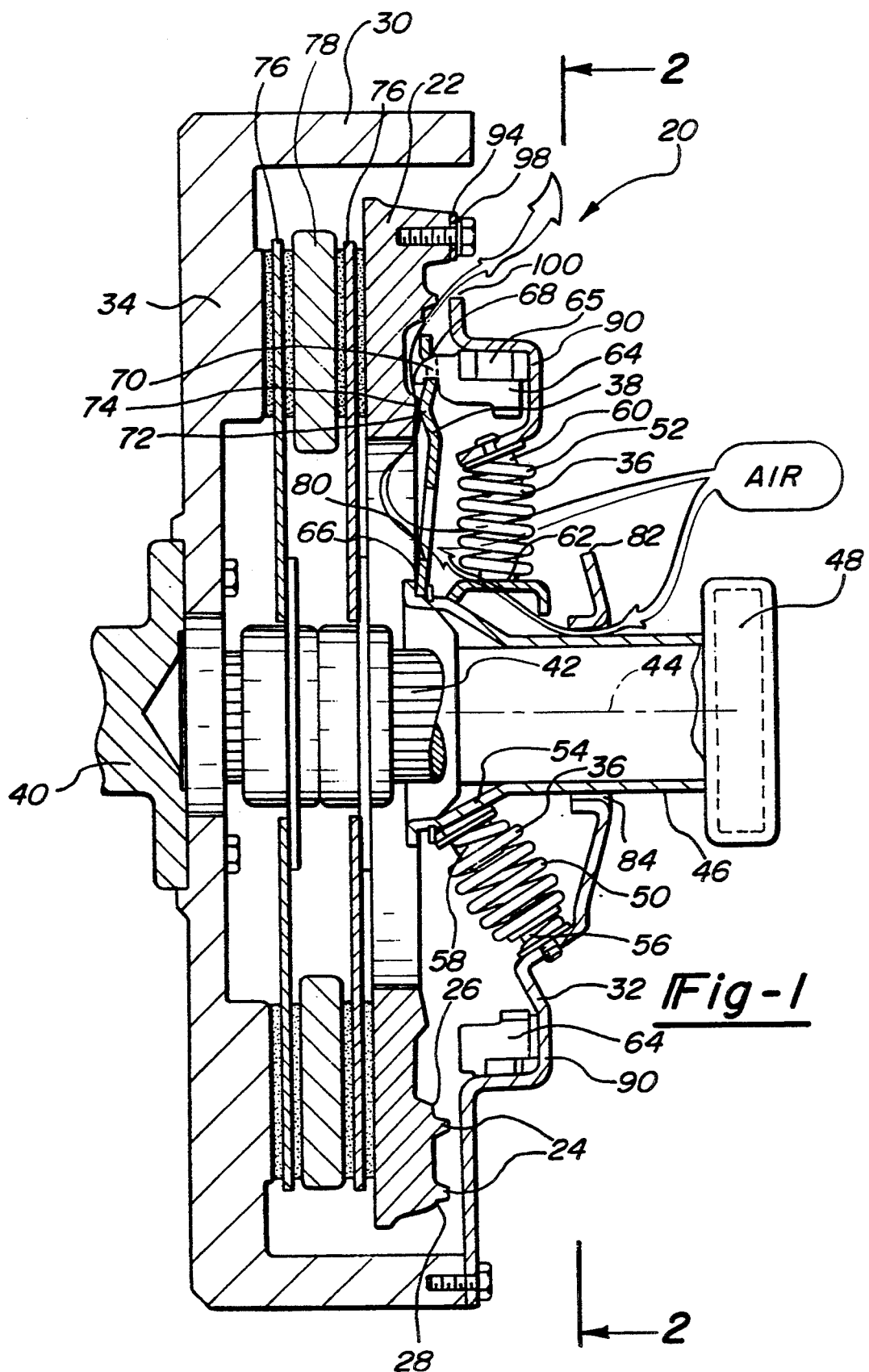
FIG. 1 is a partial cross-sectional view of a friction assembly with hydrodynamic cooling of the pressure plate according to the present invention.

Referring now to FIG. 1, a friction assembly 20 is illustrated which includes improved hydrodynamic cooling of a pressure plate 22. Pressure plate 22 includes vanes 24, which move air across pressure plate 22 during rotation from an inner diameter 26 to an outer diameter 28 of the pressure plate. As shown, friction assembly 20 is a heavy duty clutch having a housing 30 and a cover 32. Housing 30 substantially encloses the circumferential extent of pressure plate 22. Housing 30 is adapted to be secured to a flywheel 34, and cover 32 is secured to the housing.

Friction assembly 20 further includes coil springs 36, and a plurality of levers 38. Cover 32, coil springs 36 and levers 38 are adapted to facilitate improved air flow from outside cover 32 to pressure plate 22.

Friction assembly 20 transmits rotation from an input drive 40 to an output drive shaft 42. Flywheel 34 is rotated by input drive 40. Output drive shaft 42 extends along drive axis 44, and a retainer assembly 46 is positioned circumferentially about output drive shaft 42. A pull assembly 48 is carried by retainer assembly 46, and secured at one end thereof. Levers 38 pivot about an axis at the opposite end of retainer assembly 46.

Within friction assembly 20, coil springs 36 function as compression springs 50 and assistor springs 52. A plurality of compression springs 50 (shown in the lower half of FIG. 1) position retainer assembly 46 circumferentially about output drive shaft 42. Compression springs 50 are circumferentially spaced and are compressed between cover 32 and a ramped surface 54 on retainer assembly 46. The radially outer end of each spring is piloted on a seat 56 on cover 32 which is slanted such that its axis extends radially inwardly and forwardly towards a substantially coaxial seat 58 on retainer assembly 46. The seats 56 and 58 pilot the opposed ends of compression springs 50, to urge retainer assembly 46 to the left, or engaged position, as shown in FIG. 1.

A plurality of assistor springs 52 (shown in the upper half of FIG. 1) are disposed circumferentially about retainer assembly 46 between adjacent compression springs 50. Each assistor spring 52 is piloted on a seat 60 of cover 32 towards a substantially coaxial seat 62 on retainer assembly 46. Assistor springs 52 are coiled and compressed, with their axes disposed radially about the axis 44 when the clutch is in the engaged position.

To engage the clutch, levers 38 are interposed between the retainer assembly 46 and an adjusting ring 64.

Adjusting ring 64 is mounted to cover by cam rings 65, as shown, or may be threaded to cover 32. The radially inner end of each lever 38 is received in a peripheral groove 66 formed in retainer assembly 46. The radially outer end of each lever 38 has an opening 68 which receives a leftwardly projecting pivot 70 formed on the left face of adjusting ring 64.

A leftwardly extending projection 72 is intermediate the ends of levers 38. Projection 72 pivotally and pressingly engages an annular shoulder 74 formed on the right side of a pressure plate 22. Thus, leftward movement of retainer assembly 46 causes levers 38 to force pressure plate 22 to engage one of a pair of driven discs 76 thereby engaging the clutch. A driven plate 78 is spaced intermediate the pair of driven discs 76.

Each lever 38 further includes an aperture 80 at a radially inner portion between projection 72 and peripheral groove 66 formed in retainer assembly 46. Aperture 80 of each lever 38 is adapted to increase the air flow to pressure plate 22.

Figure 2:
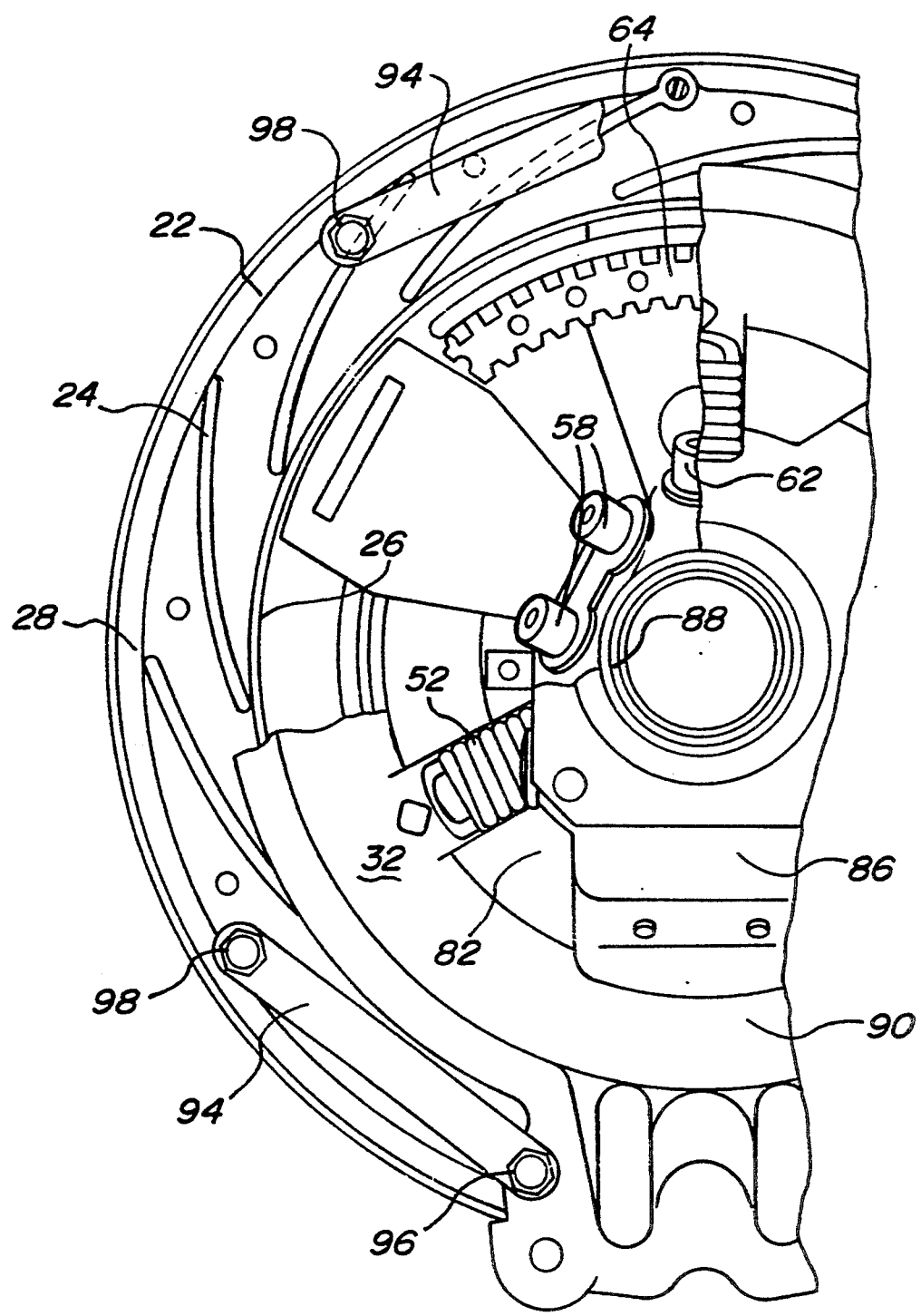
FIG. 2 is a partial front view along lines 2—2 of FIG. 1.

Referring now to FIG. 2, cover 32 is contoured to permit air flow to pressure plate 22 by including openings 82. Air flow is also permitted through a circumferential clearance 84 defined by retainer assembly and cover 32 (shown in FIG. 1). Cover 32 includes three legs 86, each leg 86 extending radially outwardly from a central portion 88. Cover 32 is further defined by an annular support 90 extending about the entire outer circumference of cover 32. Each opening 82 is thereby defined by a pair of legs 86, and annular support 90. A pair of compression spring seats 58 are located on each leg 86.

A plurality of drive straps 94 prevent rotation of pressure plate 22 relative to cover 32, but permit limited axial movement of the pressure plate. A first end 96 is attached to cover 32, and a second end 98 is attached to pressure plate 22.

Vanes 24 extend axially away from pressure plate 22. Each vane 24 extends substantially from an inner diameter to an outer diameter of pressure plate 22. Each vane is curved to define an arc along the face of pressure plate 22. The center point of the curvature for each vane 24 is off-set from the center point of the pressure plate.

Slippage of the pressure plate 22, driven discs 76 and driven plate 78 prior to coupling results in frictional heating of the pressure plate. The heat is increased due to the enclosure of the pressure plate within housing 30 and cover 32. Such heat decreases effective operation of the clutch, and increases wear on the clutch components. Therefore, the use of outside air in order to hydrodynamically cool the pressure plate enhances operation, and extends the life of the clutch.

In operation, vanes 24 move air from outside the clutch to an inner diameter of the pressure plate by rotation of the pressure plate. Outside air is moved through openings 82 in cover 32, through and around coil springs 36, and through and around levers 38.

The improved air flow is shown by arrows in FIG. 1. The flow of outside air is significantly increased by use of coil springs 36, as opposed to a diaphragm spring as used in the prior art. The conventional diaphragm spring defines a substantially solid barrier, inhibiting movement of air. In contrast, air flows through the interstices of the coil springs. Coil springs increase ventilation within friction assembly 20, and provide improved air passage to pressure plate 22. After the cooler outside air is moved across pressure plate 22, air is moved through circumferential slots 100 defined by cover 32 and pressure plate 22.

The goal of the invention, which is to improve air flow in the heavy duty clutch, can be achieved by use of any type of spring force which applies a force on retainer assembly 46 for engaging pressure plate 22 and one of the driven discs 76. Although not shown, a diaphragm spring, or equivalent, having openings for air flow through the diaphragm spring may be used. Such openings in the diaphragm spring may be radially, or circumferentially extending slots.

A preferred embodiment of the present invention has been disclosed. A worker of ordinary skill in the art will recognize, however, that modifications of the disclosed embodiment will fall within the scope of this invention. For that reason, the following claims should be studied to determine the true scope and content of this invention.

What is claimed is:

1. A heavy duty friction assembly having improved air flow for hydrodynamic cooling, said assembly comprising:

a flywheel;

a pressure plate rotating about an axis, said pressure plate having a first face oriented towards said flywheel and a second face opposite said first face& said second face of said pressure plate having a plurality of vanes extending axially outwardly away from said pressure plate, each said vane extending substantially from an inner diameter of said pressure plate to an outer diameter of said pressure plate;

a housing extending about said axis, said housing attached to said flywheel and enclosing only a circumferential extent of said pressure plate;

a cover attached to said housing, said cover being contoured to partially enclose said pressure plate and to allow air to flow from outside said cover to said pressure plate, a circumferential slot being defined between said cover and said pressure plate along a radially outer portion of said pressure plate;

a retainer assembly positioned circumferentially about said axis, said cover extending circuferentially about said retainer assembly providing a circumferential clearance between said retainer assembly and said cover for the movement of air;

a spring means having air passage means for air passage through said spring means, said spring means urging said retainer assembly towards said pressure plate, said spring means being at least partially enclosed by said cover; and a plurality of levers cooperating with said retainer assembly providing axial movement of said pressure plate, whereby rotation of said pressure plate is adapted to move air from outside the friction assembly to said pressure plate along an air flow path, said air flow path extending through said circumferential clearance between said retainer assembly and said cover, said air flow path extending across said pressure plate, said air flow path further extending through said circumferential slot between said pressure plate and said cover.

2. The friction assembly of claim 1, wherein said spring means is a plurality of coil springs interposed between said cover and said retainer assembly.

3. The friction assembly of claim 1, wherein said friction assembly further comprises a retainer assembly positioned circumferentially about said axis, said cover having a plurality of coil spring seats, said retainer assembly having a plurality of coil spring seats, said plurality of coil springs extending radially between said retainer assembly and said cover, each of said plurality of coil springs being seated upon corresponding seats of said cover and said retainer assembly.

4. The friction assembly of claim 1, wherein said plurality of levers cooperating with said retainer assembly providing axial movement of said pressure plate, said pressure plate engaging and disengaging a driven disc, said driven disc being adjacent said pressure plate.

5. The friction assembly of claim 1, wherein said cover is contoured to include openings defined by radially extending legs and an annular support extending about the outer circumference of said cover.

6. The friction assembly of claim 1, wherein each said levers includes an aperture.

7. The friction assembly of claim 1, wherein said friction assembly is a clutch.

8. A heavy duty friction assembly having improved air flow for hydrodynamic cooling, said assembly comprising:

an output drive shaft;

a driven disc received on said output drive shaft;

a pressure plate adjacent said driven disc, said pressure plate having a plurality of vanes extending outwardly away from said pressure plate along the axial direction of said drive shaft, said vanes extending from a face of said pressure plate opposite said driven disc, each said vane extending substantially from an inner diameter to an outer diameter of said pressure plate;

a housing extending about said output drive shaft, said housing substantially enclosing a circumferential extent of said pressure plate;

a cover attached to said housing, said cover being contoured to partially enclose said pressure plate and to allow air to flow from outside said cover and through said cover, a circumferential slot defined by said cover and said pressure plate along a radially outer portion of said pressure plate;

a retainer assembly positioned circumferentially about said output drive shaft;

a plurality of coil springs interposed between said cover and said retainer assembly, said plurality of coil springs having air passage means for air passage through said coil springs, said coil springs urging said retainer assembly towards said pressure plate, said coil springs being at least partially enclosed by said cover; and a plurality of levers cooperating with said retainer assembly providing axial movement of said pressure plate, said pressure plate engaging and disengaging from said driven disc, whereby rotation of said pressure plate is adapted to move air from outside the friction assembly to an inner diameter of said pressure plate along an air flow path, said air flow path extending across said pressure plate, said air flow path further extending through said circumferential slot defined by said cover and said pressure plate.

9. The friction assembly of claim 8, wherein said cover includes a plurality of coil spring seats and said retainer assembly includes a plurality of coil spring seats, said plurality of coil springs extending radially between said retainer assembly and said cover, each of said plurality of coil springs being seated upon corresponding seats of said cover and said retainer assembly, at least some of said coil springs being angled to urge said retainer assembly towards said pressure plate.

10. The friction assembly of claim 8, wherein each said levers includes an aperture.

11. The friction assembly of claim 8, wherein a circumferential clearance is provided between said cover and said retainer assembly.

12. The friction assembly of claim 8, wherein said cover is contoured to include openings defined by radially extending legs and an annular support extending about the outer circumference of said cover.

13. The friction assembly of claim 8, wherein each said vane is curved along a center point off-set from the center point of said pressure plate.

14. The friction assembly of claim 8, wherein said friction assembly is a clutch.

* * * * *